March 16, 1965   E. R. CARLSON   3,173,739
ELECTRICAL WIRING DEVICE HAVING IMPROVED CONTACT-TERMINAL MEANS
Filed Nov. 2, 1962
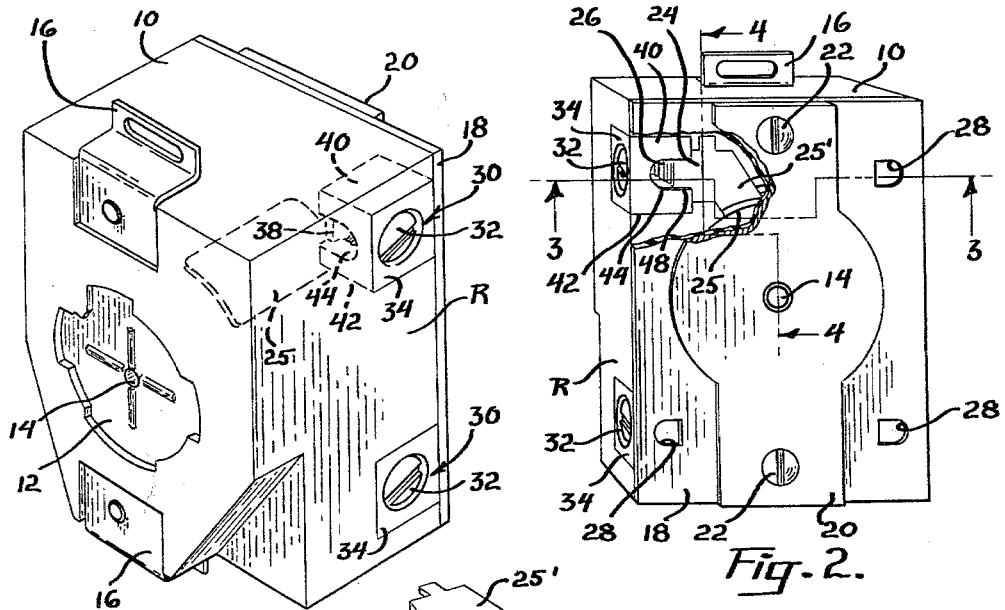
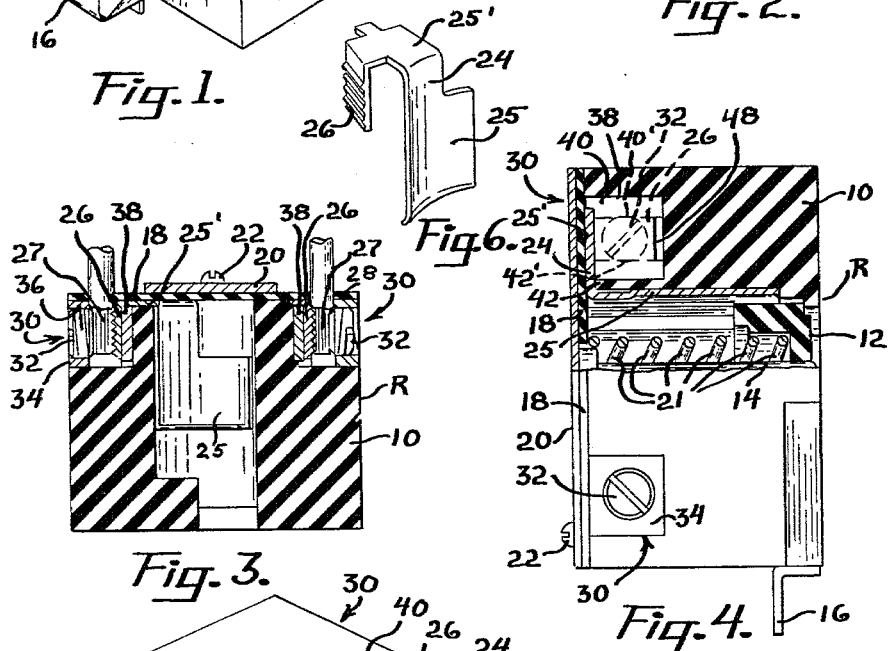
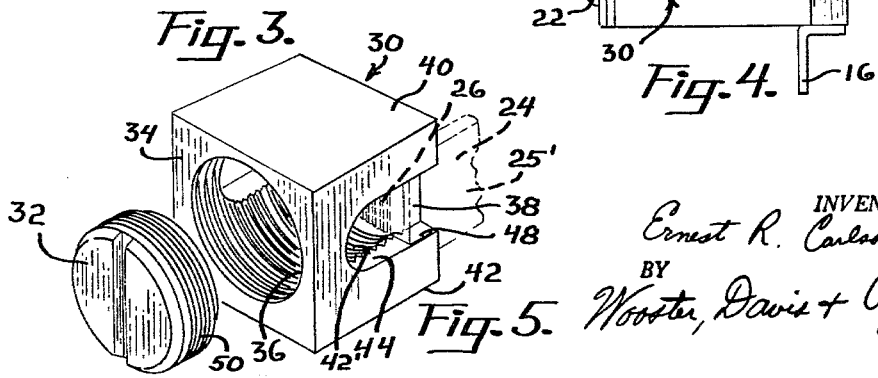
INVENTOR.
Ernest R. Carlson
BY
Wooster, Davis & Cifelli
attys.

United States Patent Office 3,173,739
Patented Mar. 16, 1965

3,173,739
ELECTRICAL WIRING DEVICE HAVING IMPROVED CONTACT-TERMINAL MEANS
Ernest R. Carlson, Fairfield, Conn., assignor to Harvey Hubbell, Incorporated, Bridgeport, Conn., a corporation of Connecticut
Filed Nov. 2, 1962, Ser. No. 234,968
5 Claims. (Cl. 339—210)

This invention relates to an improved electrical wiring device and more particularly to such a device having improved contact-terminal means.

There are numerous prior art arrangements for connecting electrical conductors to the contacts of electrical receptacles, attachment plugs and other electrical wiring devices. For example, the common screw-type terminal wherein the end of a conductor wire is stripped of its insulation and wrapped around the terminal binding screw, is a well known expedient for use in attaching electrical wires to electrical wiring devices. However, each of the known prior art devices has certain defects in its contact-terminal means which it would be desirable to eliminate. For example, in many of these devices the terminal projects from the side of the apparatus and thereby introduces clearance and shorting problems. This is especially true, for example, in electrical receptacles, switches, and similar devices which are normally installed in wall mounted outlet boxes or recesses of limited size. To obviate this difficulty, it has often been necessary in the past to provide recesses in the insulating body of the receptacle or switch so that the screw heads will not extend beyond the body of the wiring device when retracted. This raises additional problems, however, because after the end of the electrical conductor is stripped of insulation it must be bent into a loop around the shank of the binding screw. When the head of the screw is disposed within the usual recess, the amount of room available for making such a connection is reduced and frequently inadequate, and creates a condition which increases the dexterity required by the installing electrician. Additionally, side wiring is generally considered undesirable and inferior to back wiring, i.e., wiring by inserting the conductor ends through the back wall of the wiring device body, and therefore, all side wiring arrangements are preferably to be avoided. Furthermore, it often is desirable, particularly in high electrical capacity wiring devices, to make as much of the terminal means as possible nonconductive and thereby remove a possible shock hazard. Also, in screw-type connectors, the range of wire sizes that can be accommodated is limited by the necessity for bending the wire around a relatively small circumference in the limited space available and the physical difficulty of bending larger diameter wires. If the binding screws are removably mounted to facilitate connecting the looped wire to the device, they may be subject to falling out and getting damaged or lost. In general, screw-type terminals are recognized in the art to be suitable only for low capacity applications. Lastly, it is desirable to have direct contact between conductor wires and the contact means of wiring devices, and this is difficult to achieve in high capacity wiring devices wherein the contacts and terminals are frequently formed of separate elements.

Accordingly, it is the primary object of this invention to provide an improved electrical wiring device having improved contact-terminal means. Other objects are to provide a terminal individually and/or in association with an electrical wiring device which can receive wires within a wide range of diameter sizes; always remains within the confines of the wiring device body in which it is mounted; can only be wired from the back of the body; does not require bending of the conductor wire to attach it to the terminal; receives wires in direct contact with an associated contact element; cooperates with a contact element that aids in mounting and securing the terminal; has a binding screw that is irremovably mounted, and has substantial portions that may be made of nonconducting material, such as a dielectric plastic material.

The manner in which the foregoing objects are attained will be more apparent from the following description, the appended claims, and the figures of the attached drawing, wherein:

FIG. 1 is a front perspective view of an improved electrical receptacle having improved contact-terminal means in accordance with this invention;

FIG. 2 is a rear perspective view of the receptacle of FIG. 1, portions being broken away to more clearly illustrate the construction;

FIG. 3 is a sectional view taken substantially along line 3—3 of FIG. 2 showing some conductor wire ends attached;

FIG. 4 is a side elevation of the device of FIG. 2 with a portion shown in cross section substantially along lines 4—4;

FIG. 5 is an enlarged detail view of a terminal constructed in accordance with this invention with cooperating portions of a contact element shown in dotted lines, and FIG. 6 is a perspective view of a contact element.

The invention includes a novel wiring device terminal designated generally by reference numeral 30, which is illustrated in FIG. 5, and which comprises a face wall member 34 having an internally threaded opening 36 therethrough and a backing wall member 38 disposed in substantially parallel relationship to the face member but spaced from it. Retaining means 40, 42 interconnect the face and the backing members and define a wire-receiving passage 44 between them. Screw means 32 are positioned in the threaded opening 36 for advancement toward and retraction from the backing member in a direction perpendicular to the wire-receiving passage.

There is illustrated in FIGS. 1–4 an electrical receptacle R, in which one or more of the improved terminals 30 are mounted in a novel manner, of the heavy duty type, such as 30 amp. 600 volt A.C.–20 amp. 250 D.C., which is capable of accommodating four wires and utilizes four wiring terminals. The main body 10 of the receptacle is constructed of a suitable electrical insulating plastic material and is internally chambered to receive the usual electrical elements. The particular device illustrated is a receptacle of the dead front locking type wherein a spring-loaded closure plate 12 is mounted to normally obstruct access to the contacts in the receptacle, but which is arranged to selectively be forced inwardly along a central pin 14 on which it is slidably mounted by insertion of a cooperating attachment plug which is then locked in place by turning it relative to the body. However, it is to be understood that the invention is not limited to any particular type of electrical device and the four-wire, interlocking, dead-front receptacle shown is for illustrative purposes only though a desirable application for the invention. The receptacle is provided with mounting ears 16 for mounting the receptacle within an electrical outlet box (not illustrated, but generally well known in the art). The back of the receptacle body is closed by an electrical insulating plate 18 and a metallic strengthening plate 20 which is fastened to body 10 by means of screws 22. Plate 20 rigidly supports, as by riveting, pin 14 so as to extend forwardly centrally within body 10 and a coiled spring 21, which provides the resilient force against closure plate 12 by encircling pin 14 and being biased between the opposing sides of plates 20 and 12. Contact elements 24 (see FIG. 6) are positioned within the body 10 of the receptacle and each is a bent metallic strip member that includes a contact portion 25, arranged to be engaged by a contact of a detachable connector, such as an attachment plug, a bent connecting portion 25' and a terminal portion 26, which is serrated and structurally associated with a terminal 30 to mount it and to more securely grip a bared conductor wire end 27 wired thereto, all in a manner to be hereinafter explained. Each terminal 30 is mounted in a body cavity, four of which are formed in body 10 and which opens to the back and a side thereof. An opening 28 is provided in and at each of the four corners of the back plate 18 so as to overlie a cavity for individual insertion of the bared conductor wire end into a terminal 30 mounted in the cavity.

A terminal 30 is illustrated in enlarged detail in FIG. 5, and comprises a unitary, walled, flat sided, box-like body and an insertable threaded disc-like plug 32. The body includes a front face wall 34 which is provided with a central drilled and tapped opening 36 for reception of the plug 32. A back wall member 38 is spaced from and essentially parallel to the front face member 34, and the two are rigidly interconnected by a top retainer wall 40 and a bottom retainer wall 42 spaced therefrom. A wire receiving passage 44 extends completely through the terminal 30. It will be noted that, in the described embodiment, the thicknesses of the top and bottom retainer walls 40, 42 and the diameter of the threaded opening 36 are such that the internal threads of the opening 36 continue along the inner surfaces 40', 42' of retainer walls 40, 42 to the back wall member 38. Opposite side edges of back member 38 are cut away so as to provide spaced notches 48. Each notch 48 provides clearance for the insertion of the contact portion 26 of contact element 24 which then lies flush against the inner surface of back member 38, as illustrated, and therefore retains the terminal 30 in a cavity in the body 10. The peripheral edge 50 of plug 32 is threaded to match the threads of opening 36, and it is kerfed for manual rotation by a screw driver in the opening 36 and threads 40' 42' toward and away from body member 38 of the terminal. In the illustration of FIG. 5, the plug 32 is shown in the removed position. However, in an actual terminal constructed in use in accordance with the invention, plug 32 is initially screwed into opening 36 until its outer kerfed side lies below the front surface of face member 34, and then the outermost thread of opening 36 is deformed as, for example, by means of a punch, so that the plug thereafter can no longer be removed from the opening, but remains captive within the terminal 30.

A number of important advantages of this invention will now be apparent. For example, the entire terminal 30 may be readily mounted and retained within a suitably formed cavity in the body of a wiring device, such as receptacle 10, solely by means of the extending contact portion 26 of the electrical contact element 24. It should be noted in this regard that a terminal is mounted in a cavity and then a bent contact element is mounted in the receptacle body with its contact portion 25 disposed to receive a contact of an attached connector, connecting portion 25' extending through a notch 48 in back member 38, and the terminal portion 26 extending within the terminal, whereby the latter is secured in the body cavity. Secondly, it is not necessary to form a loop in a conductor wire end that is to be connected to the terminal and wrap it around a terminal binding screw. Instead, the end is merely stripped and inserted from the back of the body through wire opening 28 in plate 18, and into passage 44. The plug 32 is then screwed down so as to cause its free end to forcibly contact and depress the wire end against the terminal portion 26 to make a good electrical contact. As mentioned above, terminal portion 26 is serrated so as to provide a biting gripping surface to retain the wire end. In view of this arrangement for connecting conductor wires, which does not involve wrapping the wire around a binding screw, a wide range of wire diameters can be accommodated, being primarily limited by the size of passages 44 in the terminals; in practice, terminals can be readily constructed to accommodate wire diameters in the number 6–24 sizes. Thirdly, the plug 32, being totally contained within the body of the terminal 30, cannot project beyond the side of the receptacle body. This provides a smooth and flush surface for the wired device, as will be noted from the illustrations of FIGS. 1–4. Fourthly, the plug 32 is held captive completely within the terminal 30 by means of the deformed thread and side wiring is thereby entirely precluded. Therefore, it cannot fall out and be lost by being inadvertently backed too far out of opening 36. Finally, it will be noted that the electrical contact is made directly between the inserted wire end 27 and the contact strip portion 26. For this reason exceedingly good engagement is effected, and it is not necessary to construct terminal 30 of a conductive metal. It can be made of a conducting metal, such as copper; however, it may be constructed of a plastic or other suitable non-conductive material, if so desired, thereby minimizing shock hazard.

Many other advantages, as well as various modifications, will be apparent to those skilled in the art. Accordingly, the above description is to be construed as illustrative only and not limiting with respect to the scope of this invention. This invention is limited only by the scope of the following claims.

What I claim as new and desire to secure by Letters Patent of the United States is:

1. In an electrical wiring device having an insulating body including therein a contact chamber and a terminal cavity spaced laterally from said contact chamber, a terminal comprising a face wall member defining an internally threaded opening therethrough, a backing member disposed in substantially parallel relationship to said face member but spaced therefrom, and retaining means interconnecting said face and backing members and defining a wire receiving opening intermediate said members; said retaining means defining screw threaded portions comprising a continuation of the threads in said threaded opening; an axially movable screw plug mounted in said threaded opening and arranged for movement toward and away from said backing member totally within the confines of said terminal; and an integral U-shaped electrically conductive contact member mounted in said wiring device body and including a contact portion disposed in said chamber and a terminal portion extending into said wire receiving opening adjacent said backing member; said screw plug being arranged for selective advancement toward said backing member to force and clamp a wire inserted in said wire receiving opening against said contact member terminal portion.

2. The electrical wiring device of claim 1 wherein said terminal is made of an electrical insulating material.

3. The electrical wiring device of claim 1 wherein said contact member terminal portion has a serrated surface facing said scerw plug.

4. The electrical wiring device of claim 1 wherein the outer-most thread of said threaded opening is deformed thereby to prevent removal of said screw plug.

5. The electrical wiring device of claim 1 wherein said contact member terminal portion retains said terminal in said cavity; and an insulating plate is secured to said body for retaining said contact member and, in turn, said terminal mounted in position in said body.

References Cited in the file of this patent

UNITED STATES PATENTS

| | | |
|---|---|---|
| 508,402 | Brown | Nov. 14, 1893 |
| 2,010,853 | Dyer | Aug. 13, 1935 |
| 2,083,923 | Rowe | June 15, 1937 |
| 2,102,625 | Hubbell | Dec. 21, 1937 |
| 2,173,206 | Landmeier | Sept. 19, 1939 |
| 2,193,202 | Millermaster | Mar. 12, 1940 |
| 2,321,999 | Dalton | June 15, 1943 |
| 2,720,636 | McKinley | Oct. 11, 1955 |
| 2,950,457 | Slater | Apr. 23, 1960 |

FOREIGN PATENTS

| | | |
|---|---|---|
| 866,308 | Great Britain | Apr. 26, 1961 |